United States Patent
Shoshan et al.

(10) Patent No.: US 9,529,797 B2
(45) Date of Patent: *Dec. 27, 2016

(54) SYSTEM AND METHOD FOR WEBSITE TRANSLATIONS

(71) Applicant: One Hour Translation, Ltd., Nes Ziona OT (IL)

(72) Inventors: Ofer Shoshan, Rehovot (IL); Oren Yagev, Rehovot (IL)

(73) Assignee: One Hour Translation, Ltd., Nes Ziona (IL)

( * ) Notice: Subject to any disclaimer, the term of this patent is extended or adjusted under 35 U.S.C. 154(b) by 54 days.

This patent is subject to a terminal disclaimer.

(21) Appl. No.: 14/674,471

(22) Filed: Mar. 31, 2015

(65) Prior Publication Data

US 2015/0227512 A1 Aug. 13, 2015

Related U.S. Application Data

(63) Continuation of application No. 13/834,173, filed on Mar. 15, 2013, now Pat. No. 9,069,759.

(51) Int. Cl.
*G06F 17/00* (2006.01)
*G06F 17/28* (2006.01)
*G06F 9/44* (2006.01)
*G10L 15/00* (2013.01)

(52) U.S. Cl.
CPC ........... *G06F 17/289* (2013.01); *G06F 9/4448* (2013.01); *G06F 17/28* (2013.01); *G10L 15/005* (2013.01)

(58) Field of Classification Search
CPC .............................. G06F 17/28; G06F 17/289
USPC ............................................................ 704/8
See application file for complete search history.

(56) References Cited

U.S. PATENT DOCUMENTS

| | | | | |
|---|---|---|---|---|
| 7,174,289 | B2 * | 2/2007 | Sukehiro | G06F 17/289 704/7 |
| 8,660,244 | B2 * | 2/2014 | Blagsvedt | G06F 17/289 379/88.25 |
| 8,676,563 | B2 | 3/2014 | Soricut et al. | |
| 2011/0191165 | A1 | 8/2011 | Kiseli et al. | |
| 2012/0116751 | A1 * | 5/2012 | Bernardini | G06F 17/289 704/3 |
| 2015/0127361 | A1 * | 5/2015 | Shin | G06F 17/289 705/2 |

(Continued)

*Primary Examiner* — Daniel Abebe
(74) *Attorney, Agent, or Firm* — Carrie Stroup (57) ABSTRACT

A system, method, and computer code for a website administrator to order the translation of the strings within a website from the original language to "supported" language(s) by injecting computer code one time from a translation service website into the administrator's website template. The code subsequently analyzes, collects, and electronically transmits un-translated character strings via the Internet to the service's computer server for translation into one or more supported languages. When a user (visitor) of the administrator's website selects the supported language to view the website in, then the translated text immediately appears on the administrator's website. When the user visits the website in the future, the system automatedly displays the text in the supported language; and, it will determine if new untranslated strings appear on the website, and automatedly translate and store them, and/or store the identity of the supported language, on the user's device.

20 Claims, 10 Drawing Sheets

(56) References Cited

U.S. PATENT DOCUMENTS

2016/0162478 A1\* 6/2016 Blassin ............ G06Q 10/06311
                                                        706/12

\* cited by examiner

SYSTEM AND METHOD FOR WEBSITE TRANSLATIONS

PRIORITY CLAIM

This application is a continuation patent application of and claims priority to U.S. Ser. No. 13/834,173, filed Mar. 15, 2013.

FIELD OF THE INVENTION

The present invention relates to systems and methods for translating text on an Internet website on a continuing basis from its original language to another supported language using computer code inserted into the website template, and storing the translated strings on a web service provider's database.

BACKGROUND

Today the translation of text within a webpage (e.g. website translations) is cumbersome and rife with inaccuracies. Most website administrators copy and paste the text from their existing website into a file which is sent to a translator. The translated text is then electronically transmitted back to the administrator, who copies and pastes it into their webpage. When the administrator updates their website, they must then repeat the process. This approach is obviously inefficient and error prone.

Google machine translation plugin enables you to fetch machine translations from Google cloud servers while the translation result appears instantly as you type. Although it is provided free, the quality of the translation of the webpage text is low in the accuracy of the translation it generates. As a result, it is not used by "serious" business websites.

Globalization, also known as internationalization and localization, describes the process of adapting computer software to different languages, regional differences and technical requirements of a target market. Internationalization is the process of designing a software application adaptable to various languages and regions without requiring software engineering changes; and, localization is the process of adapting this internationalized software for a specific region or language by incorporating locale-specific components and translating text.

Localization systems as part of the existing content management system (CMS) of the website, e.g. Drupal Translation plugin, are expensive to manage as they still require managing a large team of translators that will use these systems to keep the translated version of the site up-to-date. And external localization systems—enterprise level systems—are effective and accurate, but they are very expensive.

Therefore, there is a need within the industry for a fast, easy, and accurate localization systems and methods to translate text within webpages of a website, regardless of the type of website, and to continue to translate the text as the webpages are updated but without requiring additional action from the website administrator.

SUMMARY OF THE INVENTION

The present invention comprises systems and methods for an administrator of a website to translate the text within the administrator's website from the original language as it appears on the website to another language "supported" by a host translation system server (e.g. Website Translator (WeST) system server in conjunction with a WeST website). This is achieved by injecting computer code (e.g. JavaScript) from the host website (e.g. WeST) into the administrator's website template. In one embodiment, the administrator injects the code into the template of each webpage on the administrator's website by manually copying the code into each webpage template. The code subsequently analyzes the text on the administrator's website, collects the text character strings, and electronically transmits them via the Internet to the host server. The strings are then translated using the method selected by the administrator: 1) human translators via a secure Internet network, or 2) by using automated machine translations. The translated strings are stored within the administrator's record on the WeST system database.

The system and method further comprise a user visiting the administrator's website for the first time, and selecting to view the web site in another language supported by, and as advertised on (e.g. a drop down menu), the website. A module installed on the administrator's website then instructs the system processor to determine whether the character strings on the webpages are the most current; or whether the administrator has updated the website, but the system has yet to translate the new character strings into the supported language. If the website has not been updated, then the website's text will instantly change to the supported language. If it has been updated, then the new strings are sent for translation, while the old strings are displayed in the translated language.

All character strings in the supported language are then stored on the user's electronic computing device's memory. When the user returns to the website in the future, they will automatically see the website text in the supported language.

One aspect of the present invention is a system that provides for translating text within a webpage in an automated manner after an administrator has inserted translation computer code into each webpage of their website. The system comprises: a one or more system servers (e.g. WeST or OHT) with one or more processors (e.g. CPU's) to receive requests for and task human translators, or machine translations, to translate text in real-time within webpages of a website; b. a database housing administrators' records comprising translated strings; c. a database housing records of human translators; d. a dedicated machine translation engine; e. a means for the system processor to detect un-translated strings in a supported language whenever a user visits an administrator's website; f. a means for translating strings via human translators communicating via a secure Internet connection and/or via a machine translation engine via an Internet or Intranet connection; a means for a user's device to retrieve and store translated strings into the memory on the client (e.g. user's) electronic computing device. As disclosed infra, the stated "means" primarily comprise translation computer programs, such as application program interface code, and modules installed on the administrator's website's or user's devices.

Another aspect of the present invention comprises the computer implemented method of a website administrator inputting into the WeST website, their website's domain name, the original language and the supported language to translate the character strings of the website to; and the type of translation, either human translators or machine translators. The method further comprises:

Injecting Internet computer code (e.g. JavaScript) into each webpage of the administrator's website to be translated, wherein the code comprises instructions directing the system processor(s) to identify un-translated strings in a supported language, and to direct translation and storage of the strings in the administrator's record on the system database and in memory of a visiting user's electronic computing device;

Checking by the system server (e.g. WeST and/or OHT) of the WeST website whether translation is machine or human;
if human, then the system processor(s) orders one or more human translators via a dedicated unique interface on a platform of a provider of online human translations (e.g. One Hour Translation (OHT) by means of an API); and,
if machine, then the system orders machine translations; and, Storing translated strings in the administrator's record on the system database, wherein said strings are instantly retrieved via a translation module on the administrator's website when a visitor to the site selects a translation of the text in the supported language.

The computer implemented method further comprises the following steps when a user visits the administrator's website for the first time:

Comparing the computer code (e.g. JavaScript) on a visited webpage on the administrator's website with the stored strings on the database, wherein the translation module identifies any non-translated strings and transmits them to the system server;

Translating the new strings in the same manner as strings stored in administrator's record, wherein said manner comprises human translators or machine translation;

Storing the newly translated strings in the administrator's record;

Storing all translated character strings on all user visited webpages of the administrator's website within the memory of the user's electronic computing device and/or storing the identity of the supported language; and, Automatically displaying the translated strings when the user re-visits the same webpages on the administrator's website.

Another aspect of the present invention is a computer implemented method for a website translation service to provide cost efficient real-time translations of a website. The website administrator inserts computer code from the service's website into each page of their website. The code enables the service to continually monitor the administrator's website for updates to the text, and to provide visitors to the website instantaneous translations. The service houses the translated text within the administrator's account on a system server; and updates the translations whenever a user visits the website and requests the text in one of the supported languages. The service also stores translated text on a user's device memory so that the translated text is automatically displayed each time the user visits the website. And the service electronically bills the administrator on a periodic basis (e.g. monthly) for maintaining the translations for the website; or for each translation (e.g. by word count).

Another aspect of the present invention is translation computer program(s), or part(s) thereof comprising modules and application program interfaces, comprising computer readable medium for automatically translating text within a webpage. The medium primarily comprises instructions for: 1) detecting and electronically transmitting previously untranslated character strings to a system server for translating to a supported language and storage within the administrator's system account, and on the user's device's memory; and, 2) a system CPU to order human or machine translations via an established network of hardware, software, and professional human translators.

BRIEF DESCRIPTION OF THE DRAWINGS

The invention and its different aspects and advantages will be better understood from the following detailed description of preferred embodiments of the invention with reference to the following drawing:

FIG. 7 is an illustration of a screenshot exemplifying the strings pulled from the administrator's website, giving the administrator the ability to select which strings to translate, to add notes to the human translator, and to view the total word count that they will be billed for.

DETAILED DESCRIPTION

In the following detailed description, numerous specific details are set forth in order to provide a thorough understanding of the invention. In particular, the present disclosure exemplifies a website translation (WeST) system comprising a WeST database storing website administrators' records working in conjunction with a One Hour Translation (OHT) system server via an OHT application program interface (API). The OHT system comprises a network of human translators tasked in real-time via a secure Internet network to translate text from an original language to a supported language; or the text is translated using an OHT machine translation engine. However, it will be understood by those of ordinary skill in the art that the invention may be practiced without these specific details for use with any website translation Internet system as disclosed herein.

Glossary of Terms

As used herein, the term "$3^{rd}$ Party Administrator" refers to the entity who is hosting the website that is to be translated. The $3^{rd}$ Party Administrator (also referred to as "the administrator") selects the one or more "supported" languages that a visitor to their website may select to view the website in.

As used herein, the term "User" refers to the entity who visits the hosted website and requests a translation of the website text from its "original" language into another "supported" language that the user is fluent in, wherein the request may be made from a drop down menu. When the user visits the website at any future time, the text will be automatically displayed in their chosen supported language.

As used herein, the term "Electronic Computing Device" refers to any electronic communications device comprising a central processing unit (i.e. processor) with the Internet connectivity, such as: laptops, desktops, tablets, iPads, smartphones, cell phones, personal digital assistant devices, and the like.

As used herein, the term "Software" refers to computer program instructions adapted for execution by a hardware element, such as a processor or CPU, wherein the instruction comprise commands that when executed cause the processor to perform a corresponding set of commands. The software may be written or coded using a programming language, and stored using any type of non-transitory computer-readable media or machine-readable media well known in the art. Examples of software in the present invention comprise any software components, programs, applications, computer programs, application programs, system programs, machine programs, and operating system software.

As used herein, the term "Module" refers to a portion of a computer program or software that carries out a specific function (e.g. WeST module, etc.) and may be used alone or combined with other modules of the same program. In the present invention, a WeST module detects and electronically transmits untranslated character strings from the administrator's website to the system server(s), wherein they are translated from the original language to an administrator selected supported language(s), and stored in the administrator's record on the server database. The newly translated strings are also stored in the module on the administrator's website. Additionally, a module comprising all translated strings (new and previously) are stored in the computer memory of a user visiting the administrator's website when the user selects translation of the website into one of the supported languages. The WeST module may comprise a native application, a web application, or a widget type application to carry out the methods of detecting and electronically transmitting untranslated character strings. In a one embodiment, a native application is installed on the administrator's and users' device, wherein it is downloaded automatically from the Internet. It may be written in a language to run on a variety of different types of devices; or it may be written in a device-specific computer programming language for a specific type of device. In another embodiment, a web application resides on the system server and is accessed via the Internet. It performs basically all the same tasks as a native application, usually by downloading part of the application to the device for local processing each time it is used. The web application software is written as Web pages in HTML and CSS or other language serving the same purpose, with the interactive parts in JavaScript or other compatible language. Or the application can comprise a widget as a packaged/downloadable/installable web application; making it more like a traditional application than a web application; but like a web application it uses HTML/CSS/JavaScript and access to the Internet.

As used herein, the term "Application Program Interface (API)" refers to a set of computer programming instructions, for accessing a web based software application or web tool. In the present invention, the OHT API is computer software that is stored in the OHT system server computer memory. The OHT API functions to enable the WeST module to access the OHT system to task human or machine translators; and store and retrieve translated website springs within the administrators' records on the WeST databases.

As used herein, the term "A System" may be used to claim all aspects of the present invention wherein it refers to the entire configuration of hardware and software in all embodiments. Preferred embodiments are illustrated in the system architectures of FIGS. 1A, 1B, and 1C.

As used herein, the terms "Processing," "Computing," "Calculating," "Determining," "Establishing", "Analyzing", "Checking", or the like, may refer to operation(s) and/or process(es) of a computer, a computing platform, a computing system, a computer central processing unit (CPU), or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

System Architecture

Figure 1A:
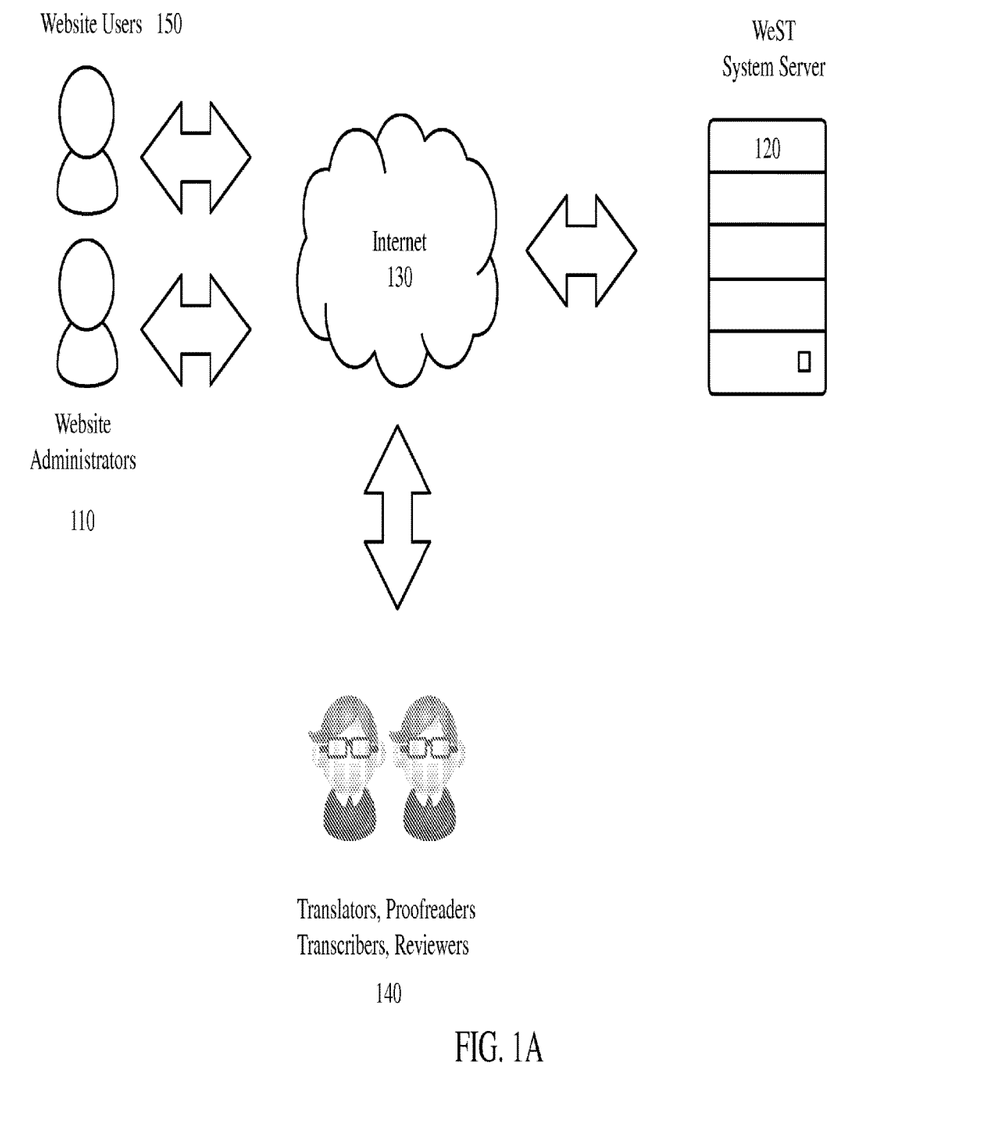
FIG. 1A is an illustration of the primary entities interacting in the present invention: website administrators ordering human translations of their webpages over the Internet from a system server; and user's visiting the administrator's website and selecting to see the webpages' text in a supported language.

FIG. 1A provides a diagram to illustrate the main entities cooperating in ordering and maintaining websites displaying up-to-date translated text. Website administrators 110 navigate to the website of the website translation service 120 (e.g. WeST) via the network 130 (e.g. Internet), and order translations of their webpages from their "original" language to one or more "supported" languages. In the illustration of FIG. 1A, the administrator has selected that the translation be conducted by human translators 140. It is noted, though, that they may have also selected machine translations (not shown). When a user 150 subsequently navigates to the website of the administrator 110 and elects to view the website in one of the "supported" languages, they will immediately see the webpages translated. And when the user visits the same website in the future, they will not have to elect the "supported" language again. Instead, it will be automatically displayed, as well as any updates since their last visit to the website.

Additionally, all parties (e.g. users, administrators, human translators, etc.) may connect to the Internet via a variety of methods such as a phone modem, wireless (cellular, satellite, microwave, infrared, radio, etc.) network, Local Area Network (LAN), Wide Area Network (WAN), or any such means as necessary to communicate to the translation service provider system server, processor, and database.

Figure 1B:
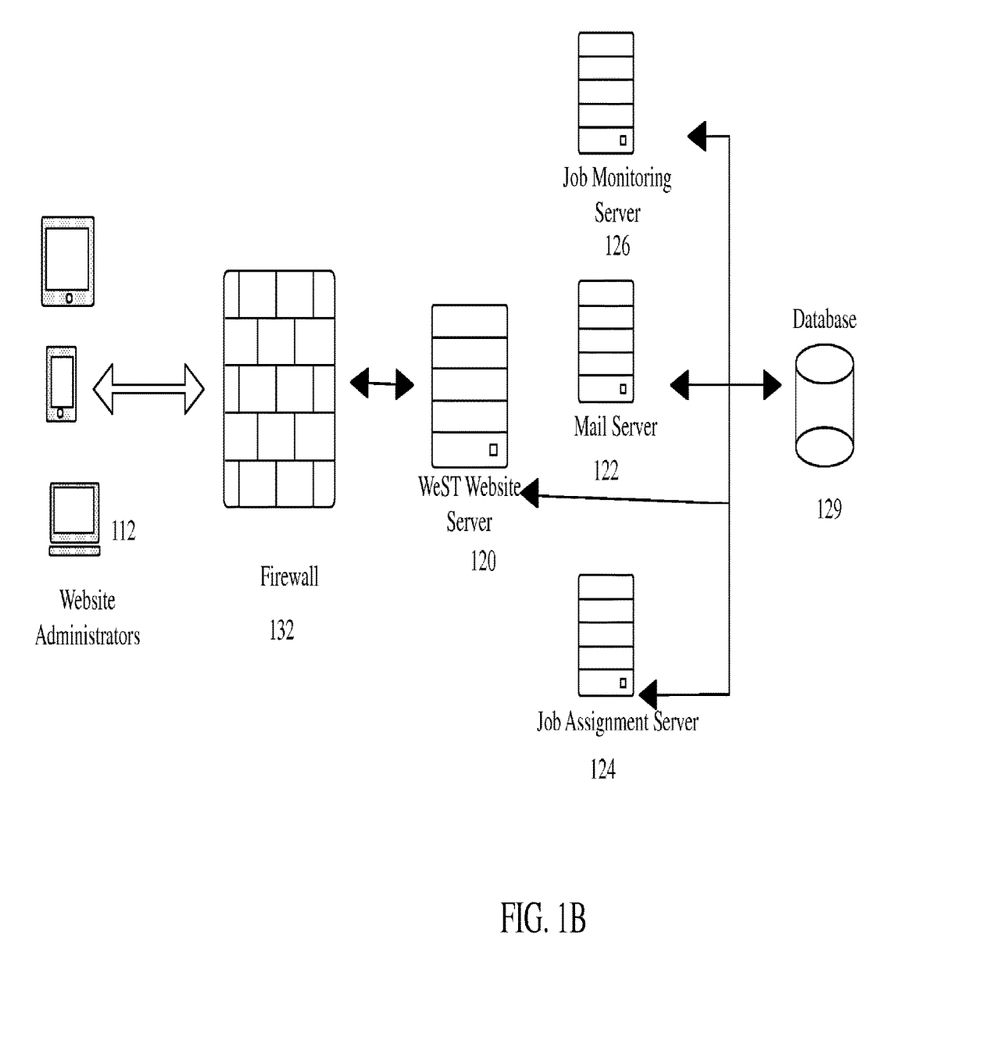
FIG. 1B is a block diagram of the website translation system (WeST) of FIG. 1A comprising the electronic computing devices of the website administrators communicating through an Internet firewall with the WeST system server, which comprises a database and three sub-servers: job assignment, job monitoring, and mail.

FIG. 1B is a block diagram of the actual hardware components comprising the system of the present invention. The electronic computing devices 112 of the website administrators communicate via an Internet firewall 132 with the website translation system server 120 (e.g. WeST server). The administrator's device may further comprise a module (e.g. WeST module) being installed thereon that communicates with the server(s) 120 to retrieve translated strings from the administrator's record on the server database.

In one embodiment of the website translation service, the server 120 may further comprise the following components. A central processing unit (CPU) and memory to compute and direct all of the main tasks of the website translation service, such as identifying whether the administrator has selected human or machine translation, detecting un-translated strings and transmitting them electronically to the system server for translation, computing and electronically billing the administrator, and receiving and storing the translated strings in the administrator's record. The system server may further comprise additional servers to accomplish this, such as a Mail, Job Assignment, Job Monitoring Server, as well as a database. The Mail Server 122 receives and transmits electronic communications primarily with the clients (e.g. website administrators) and the human translators 140. The Job Assignment Server 124 receives and processors requests from website administrators to translate their webpages. The Job Monitoring Server 126 updates the translation on the websites when their webpages are changed by their website administrators. And the system database 129 stores record's comprising, for example, the administrator's website domain name and/or URL, the supported languages selected by the administrator, the strings translated for each supported language, and any billing information for the administrator to electronically pay for the translation service (e.g. monthly billing). And the website translation server may further comprise a server dedicated to all aspects of managing the character strings translated on each administrator's website (see "Strings Server", FIG. 1C).

The system further comprises one or more users who visit the administrator's website via the web browser on their electronic computing device 150 and 152. The user(s) select a supported language to view the website in via for example a drop down menu of languages displayed on the website. When the user visits the website in the future, the text will automatically be displayed in the selected support language via the translated strings stored in the user's device's memory.

Figure 1C:
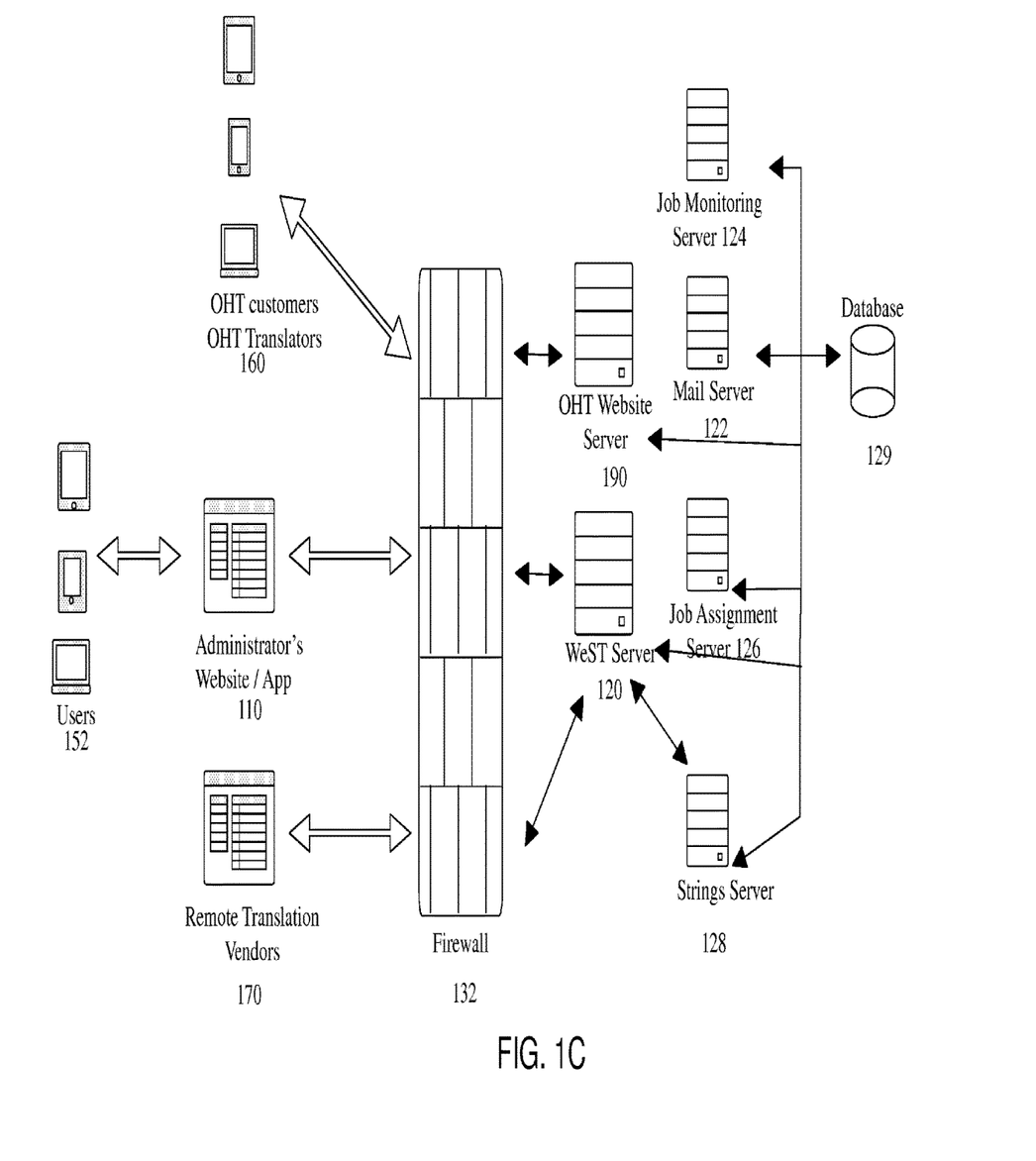
FIG. 1C is a block diagram of an expanded system of website translation system (WeST) of FIG. 1B working tandem with a translation service (OHT), wherein the two may share a database and sub-servers.

Another embodiment of the system is illustrated in FIG. 1C, and comprises the website translation service of FIG. 1B working in tandem with a website service that translates documents electronically transmitted from their customers and translators 160 via the Internet firewall 132 to the server 190 (e.g. OHT system server). The two translation servers (document and websites) may then share the Mail server 122, the Job Assignment server 124, the Job Monitoring server 126, the Strings server 128, and the Database 129.

The OHT system server 190 may also be in electronic communication with the WeST system server 120, via for example Internet or Intranet connections, so as to permit the OHT CPU to pull and push translation and customer data. Additionally, the OHT website may provide an applications program interface that permits the WeST website to work in conjunction with the OHT website.

And as illustrated in FIG. 1C, the OHT system server 190 further comprises storing in a database, such as Database 129, the following: records for each human translator comprising for example, their native language, translation experience, context areas of expertise, and past work performance and score. The OHT system server 190 also comprises a central processing unit for tasking and managing human and machine translations (e.g. Remote Translation Vendors 170); a dedicated machine translation engine, computer memory storing the OHT operating system and OHT software (e.g. OHT API), and means to connect to the Internet to communicate with human translators, and/or website administrators and users and/or the WeST system 120.

Translation Setup by Administrator

Figure 2:
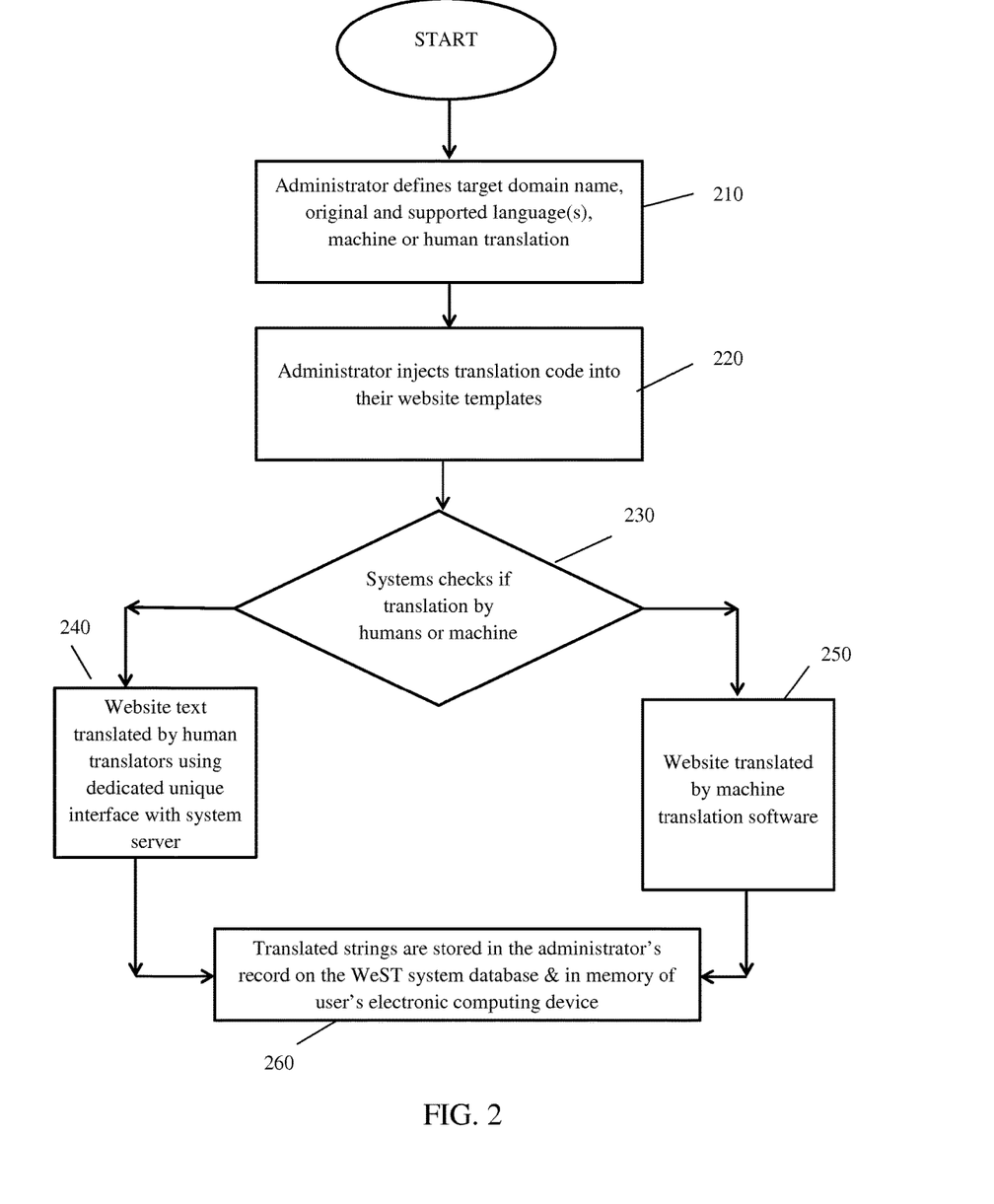
FIG. 2 is a flowchart of steps of the administrator in ordering translations of their websites and storing the translated strings within their record on the system database.
Figure 3:
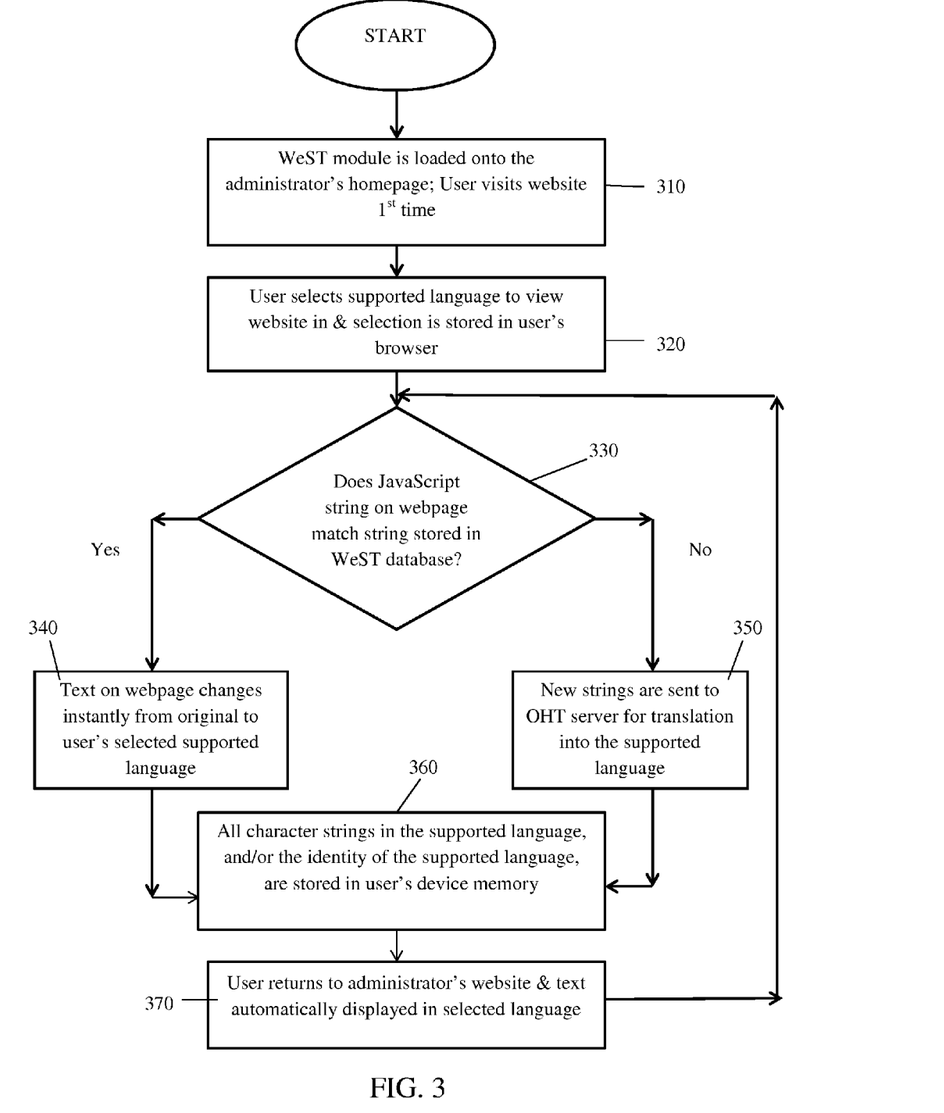
FIG. 3 is a flowchart of steps when a user visits the administrator's website for the first time and requests to view the text in another "supported" language; and on how subsequent visits the text is automatically displayed in the supported language.
Figure 4:
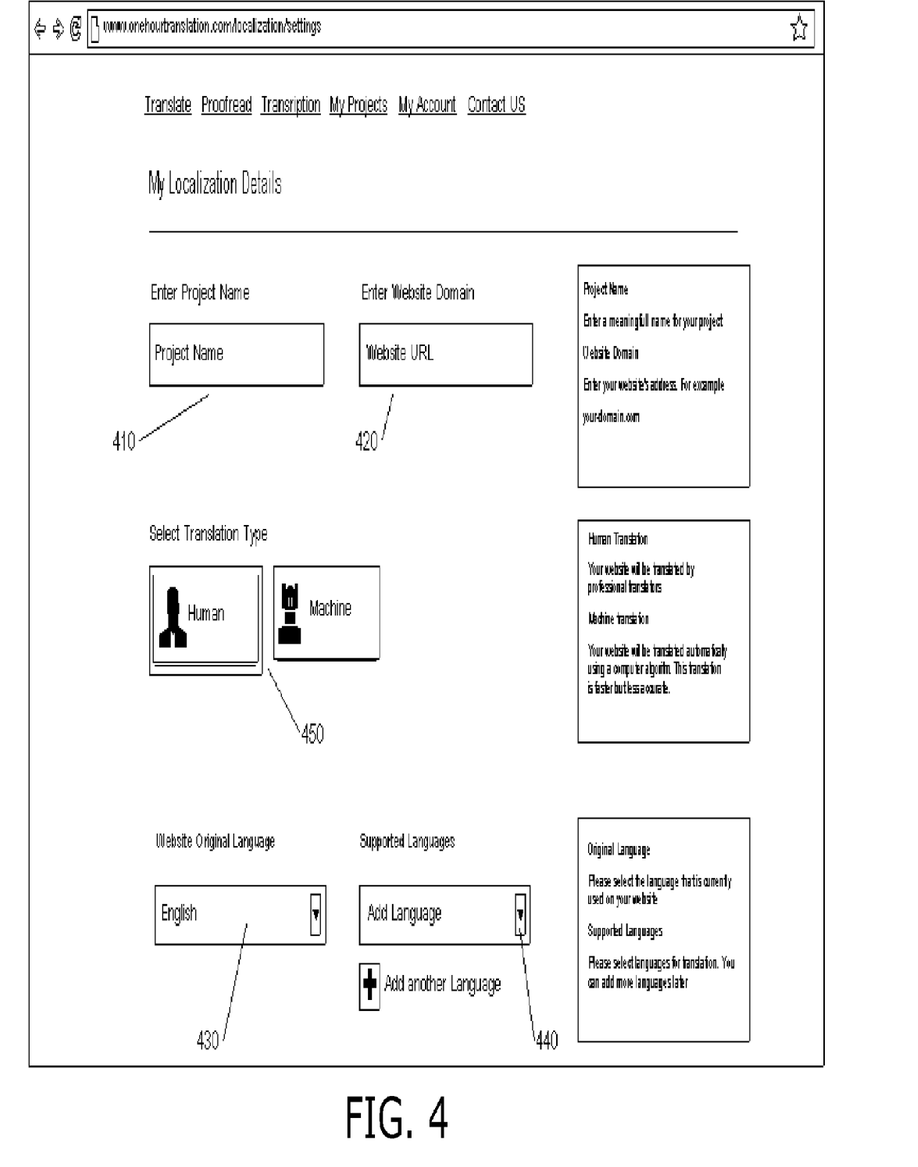
FIG. 4 is an illustration of a screenshot exemplifying a website administrator defining the website's domain name, the original and supported language(s), and the type of translation (manual or machine).

As illustrated in the flowchart of FIGS. 2 and 3, and the exemplified screenshots of FIGS. 4-8, the methods of the present invention comprise the following steps.

After an administrator registers and/or logs into the website translation system server 120 housing the application program interface (e.g. OHT API) via a website (e.g. OHT website), then the administrator selects a means of starting a new translation project (e.g. "New Project" tab). In the flowchart of FIG. 2 step 210, the website administrator assigns a name to the translation project and s/he defines the target domain name of his or her website (see FIGS. 4, 410 and 420). Means of defining a domain name are well known in the art, such as the administrator typing in, or cutting and pasting in tab 420.

And in step 210, the administrator also selects the first language, which is the original language that their website is currently written in (e.g. FIG. 4, 430); and the second, third, etc. supported languages that they are selecting that their website be translated to. The administrator may select one or more support languages from, for example, a drop down menu (e.g. FIG. 4, 440). Furthermore in step 210, the administrator also selects whether to have the translation performed by a human translator or by a machine (see FIG. 4, 450).

Figure 5:
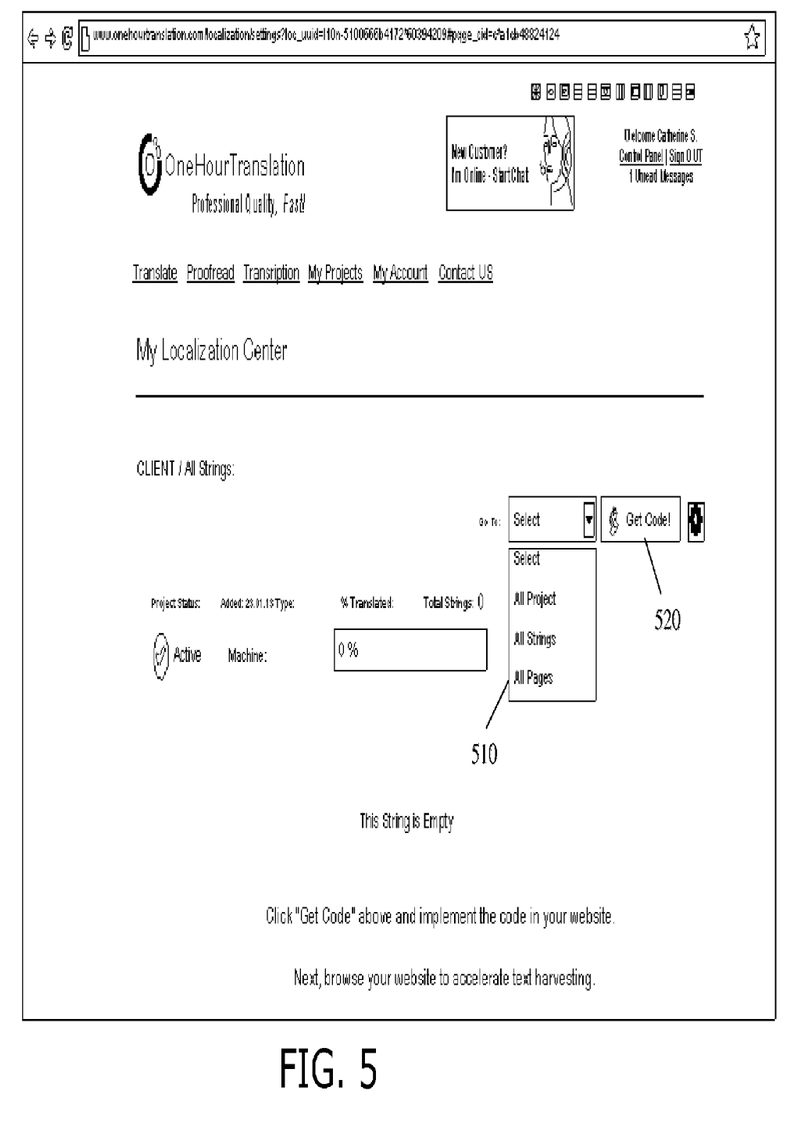
FIG. 5 is an illustration of a screenshot exemplifying the administrator designating the strings on their website to be translated and retrieving the translation computer code (i.e. selecting "Get Code").
Figure 6:
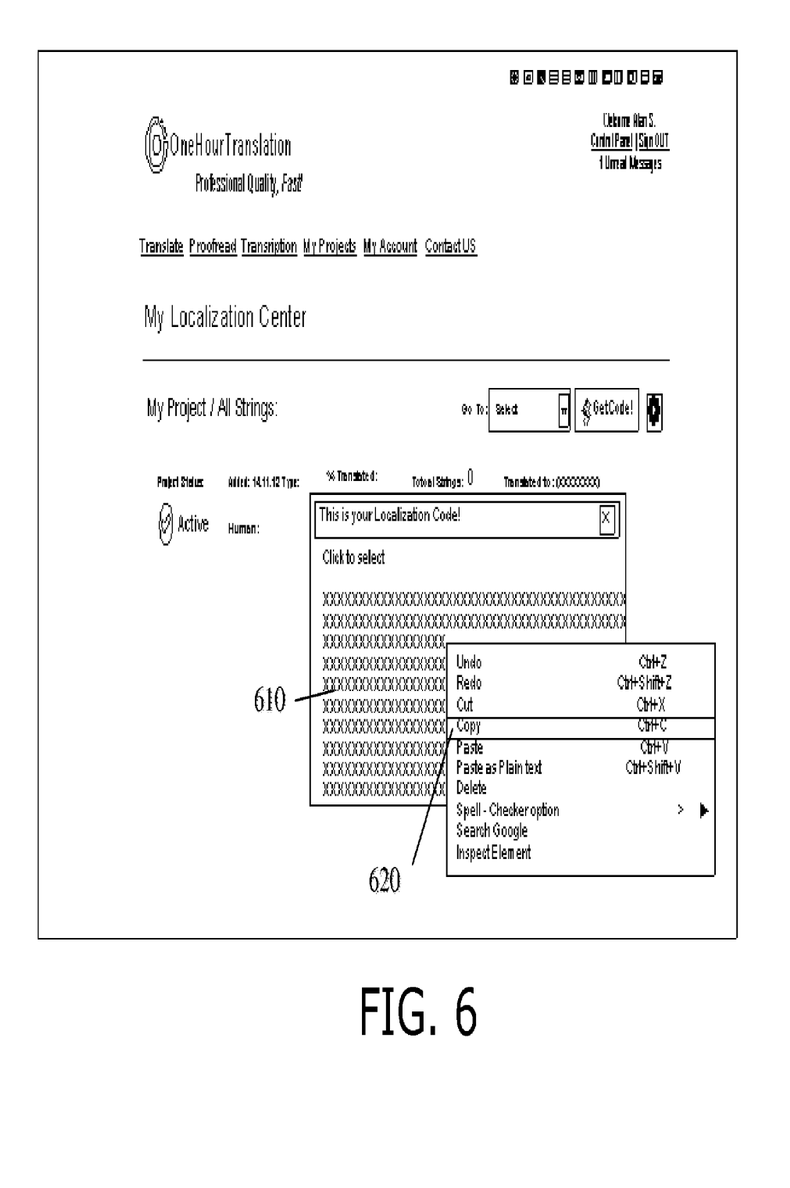
FIG. 6 is an illustration of a screenshot exemplifying the code the administrator copies into each webpage of their website that they want translated into another supported language.

In step 220, the administrator injects Internet based translation computer code (e.g. JavaScript) from the system server 120 into their request for translation on the system website. For example, and as illustrated in FIG. 5, the administrator selects from a drop down menu 510 whether to retrieve translation computer code for all of their projects (i.e. all of their different websites); or all strings within one website; or all webpages with a website. The administrator then selects a tab 520 to actually "Get" the code. As shown in FIG. 6, based upon the administrator's selection in 510, the system will display translation computer code 610 for each supported language the administrator selected. The administrator will then copy the computer code for all of the selected supported languages with one-click (copy) into each page of their web site 620.

Figure 7:
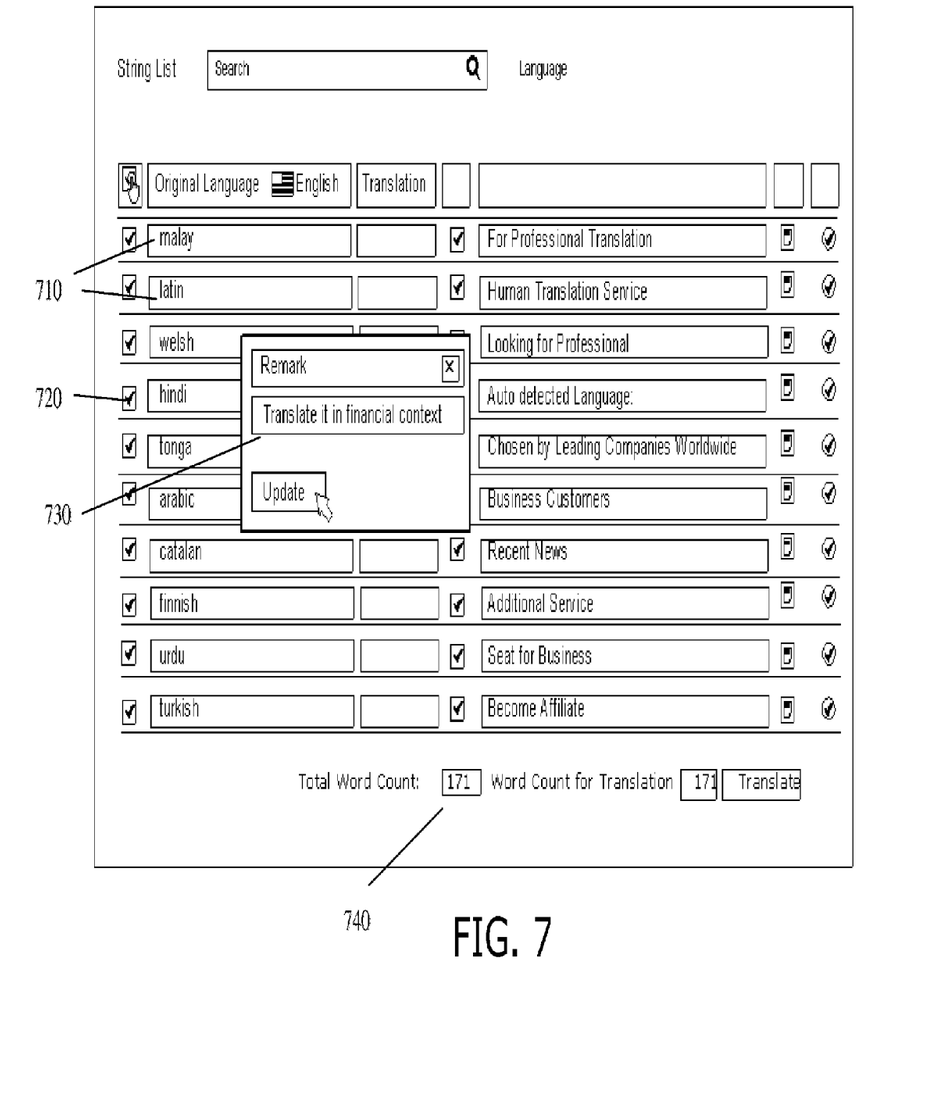
Figure 8:
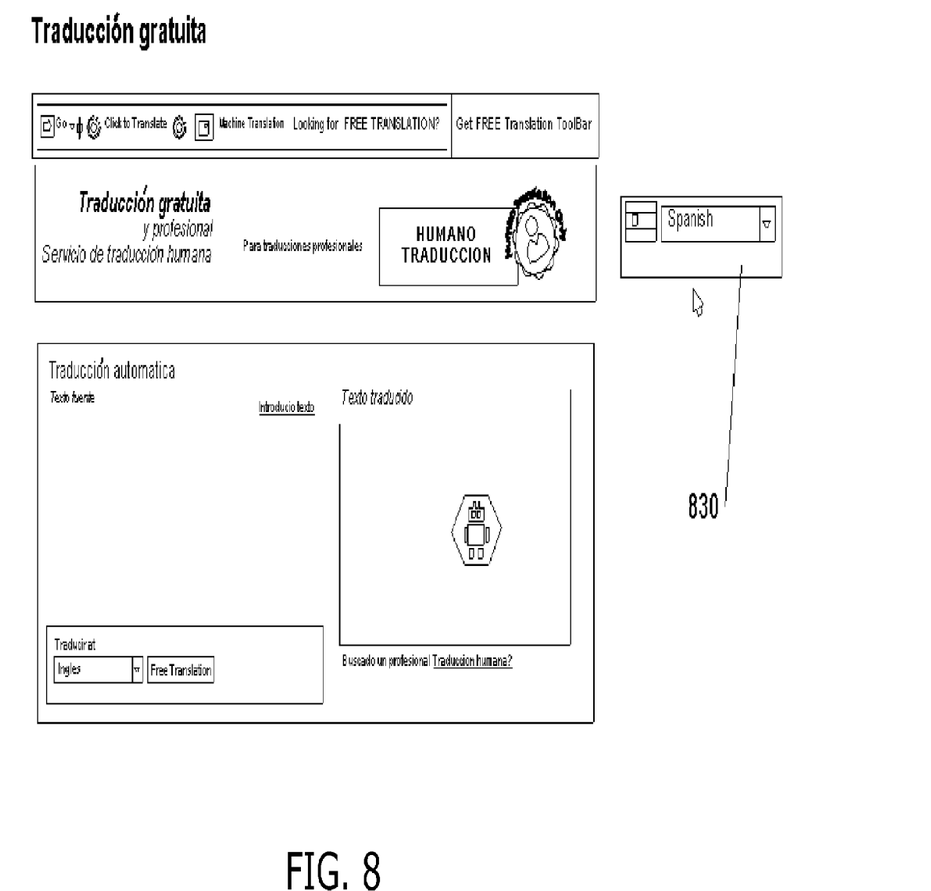
FIG. 8 is an illustration of a screenshot exemplifying a website that automatically displays the text in a user's specified supported language, and the means for a user to select another supported language via a drop down menu.

Then as illustrated in FIG. 7, the system will display all of the strings 710 retrieved by the system server from the administrator's website. The administrator may select which strings to have translated, which by default is all strings 720. The administrator may also enter a note 730 to the human translator, such as designating the context of the text within the website. And in a preferred embodiment, the administrator may view the word count that they are requesting be translated 740, before ordering and paying for the translation.

Once the administrator has placed their order with the system server, the server will determine whether they selected "human" or "machine" translation (step 230). When a human translator is selected (step 240), then the translator works using a dedicated unique interface on the system server 120, such as disclosed herein by reference in United States Patent Application 20110307495 A1 entitled "System and Method for Evaluating the Quality of Human Translation Through the Use of a Group of Human Reviewers". In a preferred embodiment, the human translator is a professional translator who is a native speaker in the supported language. The CPU of the WeST system server 120, and/or OHT system server 190 with the OHT API, automatically assigns specific professional human translators to a project based on the human translator's profile that is stored on the OHT database; and/or, an administrator of the WeST and/or OHT system server may manually assign projects to translators. When the administrator selects more than one supported language translation, then a one or more professional human translator for each language is tasked. Assignments to specific translators may also be based on other characteristics in addition to being a native speaker of the supported language, such as being an expert in the context or subject matter of the website.

When the WeST system server determines that a "machine" translation was selected by the $3^{rd}$ party administrator (step 250), then the machine translation is conducted automatically by a dedicated translation engine on the OHT system server 190, or electronically transmitted to a machine translation engine maintained by a $3^{rd}$ party contractor (e.g. remote translation vendors 170). Methods of machine translations are well known in the art such that one of skill could readily utilize the WeST system server 120 in conjunction with alternative machine translation hardware and software to accomplish equivalent translations of website strings as per the present invention.

In step 260, all translated strings, whether they are translated by machine or human translators, are stored in the administrator's record on the WeST system database. Additionally, a WeST module is loaded onto each webpage of the administrator's website to enable each webpage to retrieve the translated strings in real-time from the administrator's record on the WeST system database for the supported language selected by the current user of the website (see FIG. 3).

User Visits Website

As shown in the flowchart in FIG. 3, step 310, when a user visits the administrator's website using the browser on their electronic computing device (e.g. tablet, desktop, laptop, PDA, smartphone, etc.), the WeST module is loaded onto the administrator's website. If it is the first time that the user has visited the website, or if the user has previously visited the site but not opted to view the text in another language, then the user will see the web site text in its original language.

In step 320, the user may select to read the text in one of the supported languages that the administrator selected in step 210. In a preferred embodiment, the selection of the supported language by the user is made from a drop down menu on the home page of the administrator's website (see FIG. 8, 830). Each subsequent time the user visits the administrator's website from their device, the text will automatically be displayed in their chosen supported language.

The WeST module compares the strings on each webpage visited by the user on the administrator's website to determine if the webpages have recently been updated by the administrator but not yet translated into the user's supported language (step 330). Strings that have been updated change instantly to the user's supported language (step 340). And strings that have not been updated are sent by the module to the OHT server for translation to the supported language (step 350). The newly translated strings are then displayed on the webpage, and stored in the administrator's record on the WeST database.

To accomplish steps 330-350, the, WeST translation computer code (e.g. JavaScript) that was inserted into each webpage of the administrator's website, parses and filters out common tags and blacklisted tags by utilizing hashing for comparison with the character strings stored in the WeST database. From this comparison, the system CPU is able to identify 'delta'—new 'un-translated' strings—which are pushed into a hierarchical database, and are stored for the original webpage and on the global website context In step 360, all character strings (previous and/or newly translated) in the user's supported language are stored in memory of the user's electronic computing device. Additionally, or alternatively, the user's selection of a particular supported language is stored in their device's memory.

In step 370, the user returns at a subsequent (future) time to visit the administrator's website, and the website repeats steps 330-360. The WeST module immediately identifies the user's selected supported language, and checks to see if new strings are on the webpage that have not been previously translated into the supported language (step 330). If not, the webpage instantly displays text in the supported language (step 340). If new strings have been inserted by the administrator as determined by comparing them to the strings stored in the administrator's record on the WeST database and/or on the user's devices memory, then the new strings are translated and the webpage is displayed in the user's selected supported language (step 350). All of the character strings, previous and newly translated, are then stored in the computer memory of the user's electronic computing device (step 360).

CONCLUSION

The aforementioned flowchart and diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Likewise, the terms "plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Although various features of the invention may be described in the context of a single embodiment, the features may also be provided separately or in any suitable combination. Conversely, although the invention may be described herein in the context of separate embodiments for clarity, the invention may also be implemented in a single embodiment.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

What is claimed is:

1. A computer implemented method for automatically providing translations of text from an original language to one or more supported languages on an administrator's website by an Internet based translation service provider, comprising:
   a. inputting by a website administrator into a translation service provider website a request to translate character strings displayed as text on an administrator's website;
   b. injecting an Internet computer code from the translation service provider website into a template of the administrator's website;
   c. storing translated strings in a website administrator's record on a system database of the translation service provider, wherein said strings are instantly retrieved and displayed when a user of the administrator's website selects a translation of the text in one of the supported languages;
   d. visiting by a user via an electronic computing device the administrator's website for the first time, and selecting the supported language to view the website in;
   e. retrieving and displaying by the system processor from the system database, the strings translated into the supported language;
   f. storing by the system processor the translated strings, and/or the identity of the user's selected support language, in a memory of the user's electronic computing device; and,
   g. visiting by the user via the user's electronic computing device the administrator's website a second or subsequent time, wherein the website is automatically displayed in the user's selected supported language.

2. The method of claim 1 further comprising:
   h. identifying by the system processor any un-translated strings on the administrator's website in the supported language;
   i. electronically transmitting by the system processor un-translated strings to be newly translated;
   j. receiving and displaying newly translated strings on administrator's webpage in the user selected support language; and,
   k. storing all translated strings in the system database and/or on the user's electronic computing device memory.

3. The computer implemented method of claim 1, wherein inputting a request by the website administrator further comprises providing:
   a. an administrator's website domain name;
   b. an original language of the website text; and,
   c. one or more supported languages to translate the text into.

4. The computer implemented method of claim 3, wherein inputting a request by the website administrator further comprises selecting a type of translation, comprising human translation or machine translation.

5. The computer implemented method of claim 4 wherein,
   a. if human translations are requested, then the system processor orders via secure electronic communications transmitted on the Internet, one or more professional human translators that are native speakers in the supported language(s); and,
   b. if machine translations are requested, then the system processor orders machine translations via secure electronic communications transmitted on the Internet or via an Intranet to a system machine translation engine.

6. The computer implemented method of claim 1, wherein injecting of computer code comprises manually copying and pasting of an Internet computer code from the provider's website into a template on each webpage of the administrator's website.

7. The computer implemented method of claim 1, wherein injecting comprises manually copying and pasting of an Internet computer code one time into a template on each webpage regardless of the number of supported languages that translations are requested for.

8. An Internet based translation service provider system for automatically providing translations of text on an administrator's website by an Internet service provider comprising:
   a. a system server, comprising:
      i. a database comprising administrators' records comprising translations of an administrator's website character strings from an original language to one or more supported languages;
      ii. a database comprising a plurality of human translators' records comprising the identity of each translator's native language, wherein (i) and (ii) may be co-located;
      iii. one or more processors;
      iv. a non-transitory computer-readable storage device comprising instructions for processor(s), wherein said processors are configured to execute said instructions to perform operations comprising;
         receiving a request from a website administrator electronic computing device to translate character strings displayed as text on an administrator's website into one or more supported languages;
         translating and storing the character strings, wherein said strings are instantly retrieved and displayed when a user of the administrator's website selects a translation in one of the supported languages;
         automatically displaying the administrator's website in the user's selected supported language when the user subsequently visits the website;
   b. one of more user electronic computing devices for communicating with the system server to retrieve translated strings in one of the supported languages;
   c. one or more administrator electronic computing devices for requesting and receiving translation of strings from the system server via the system website; and,
   d. an Internet network for transmitting electronic communications between the electronic computing devices, the machine translation engine, and the server system.

9. The system of claim 8 further comprising,
   automatically identifying any new un-translated strings on the administrator's website in the original language;
   electronically transmitting the un-translated strings to an Internet service provider's processor for translation to the user's selected supported language; and,
   receiving and displaying the translated strings on the administrator's website.

10. The system of claim 8 further comprising storing all translated strings in the administrator's record on the system database.

11. The system of claim 8 further comprising storing all translated strings, and/or the identity of the user's selected support language, on the user's electronic computing device memory.

12. The system of claim 8, wherein a request from a website administrator comprises the administrator inputting into a system server website:
   a. an administrator's website domain name;
   b. an original language of the website text; and,
   c. one or more supported languages to translate the website text to.

13. The system of claim 12, wherein the request further comprises the administrator injecting instructions for the processors to identify and retrieve un-translated strings in an original language into a template on each webpage of the administrator's website.

14. The system of claim 13, wherein injecting comprises manually copying and pasting of instructions for processors from the system's website into a template on each webpage of the administrator's website.

15. The system of claim 13, wherein injecting comprises manually copying and pasting of instructions for processors one time into a template on each webpage regardless of the number of supported languages the webpages are requested to be translated into.

16. The computer system of claim 8, wherein inputting a request by the website administrator further comprises selecting a type of translation, comprising human translation or machine translation.

17. A non-transitory computer readable storage medium comprising instructions, the instructions being operable to enable a website administrator's electronic computing device to perform a procedure translating an administrator's website strings from an original language to one or more supported languages, comprising:
   a. comparing character strings on an administrator's website with strings stored within an administrator's record on a remote system database,
   b. identifying and transmitting any non-translated strings to a remote system server via the Internet for translation to one or more supported languages;
   c. retrieving translated strings from a website administrator's record on the system database, wherein the user has requested to view the administrator's website in the supported language; and
   d. displaying automatically the translated strings when the user re-visits the administrator's website.

18. The non-transitory computer readable storage medium of claim 17 further comprising instructions, the instructions being operable to enable a website administrator's electronic computing device to perform a procedure translating an administrator's website strings from an original language to one or more supported languages, comprising:
   e. automatically identifying any new un-translated strings on the administrator's website in the original language;
   f. electronically transmitting the un-translated strings to an Internet service provider's processor for translation to the user's selected supported language; and,
   g. receiving and displaying the translated strings on the administrator's website.

19. The non-transitory computer readable storage medium of claim 17 further comprising instructions for translating the website strings via human translation or machine translation as selected by the website administrator.

20. The non-transitory computer readable storage medium of claim 17 further comprising instructions for storing all translated strings, and/or the identity of the supported language, on the user's electronic computing device memory.

\* \* \* \* \*